United States Patent
Meitin et al.

(10) Patent No.: US 6,306,058 B1
(45) Date of Patent: Oct. 23, 2001

(54) WIDE RANGE VARIABLE STEP AUTOMATIC TRANSMISSION FOR AUTOMOBILES, TRUCKS, BUSES AND OTHER APPLICATIONS

(76) Inventors: Manuel Meitin; Douglas Manuel Meitin, both of Calle Blasco Ibanez No 19 Apto 12, Las Palmas, Gran Canaria (ES), 35006; Miguel Antonio Quinones, 14791 SW. 288 St., Miami, FL (US) 33033

( * ) Notice: Subject to any disclaimer, the term of this patent is extended or adjusted under 35 U.S.C. 154(b) by 0 days.

(21) Appl. No.: 09/507,637

(22) Filed: Feb. 22, 2000

Related U.S. Application Data

(60) Provisional application No. 60/160,747, filed on Oct. 21, 1999.

(51) Int. Cl.[7] .................................................. F16H 47/08
(52) U.S. Cl. .................................................. 475/52; 475/53
(58) Field of Search .................................. 475/52, 53, 57

(56) References Cited

U.S. PATENT DOCUMENTS

| | | | |
|---|---|---|---|
| 3,503,277 | * | 3/1970 | Weinrich et al. ................... 475/52 |
| 3,924,489 | * | 12/1975 | Yasuda ................................. 475/53 |
| 4,117,745 | * | 10/1978 | Yokoyama et al. .................. 475/52 |
| 4,913,002 | * | 4/1990 | Fellows ............................... 475/53 |

* cited by examiner

Primary Examiner—Dirk Wright
(74) Attorney, Agent, or Firm—Olga Gonzalez, P.A.

(57) ABSTRACT

An automatic transmission for automobiles, trucks, buses and other appliances comprising some kinds of railway transmissions; agricultural and harvester equipments; motor lifters and elevators and other particular appliances, having an internal combustion engine and driving wheels; traction wheels or sprocket wheels depending on the appliance, which includes: a mechanic torque converter connected with an engine output, for variable converting the torque from the engine and transmitting the mechanically converted torque, in accordance with the vehicle driving conditions to the driving wheels, traction wheels or sprocket wheels, and a fluid torque converter for modifying both converters gear ratio and transmitting together with the mechanic torque converter a torque to a common converters output and from it to the driving wheels; traction wheels or sprocket wheels depending on the appliance, and a reverse drive mechanism connected with both converters output for reversibly transmitting the converted torque to the driving wheels; traction wheels or sprocket wheels depending on the appliance.

2 Claims, 3 Drawing Sheets

WIDE RANGE VARIABLE STEP AUTOMATIC TRANSMISSION FOR AUTOMOBILES, TRUCKS, BUSES AND OTHER APPLICATIONS

This application claims benefit of Provisional No. 60/160,747 filed Oct. 21, 1999.

BACKGROUND OF THE INVENTION

Classification Definition

This invention relates generally to automatic transmissions for automobiles, trucks, buses and other appliances, and more particularly to an automatic transmission combined with an internal combustion engine for vehicles.

1. An automatic transmission usually comprises: a fluid torque converter connected to an internal combustion engine for transmitting torque from the engine to the driving wheels. The torque generated by the engine is transmitted in various gear ratios to the driving wheels in cooperation with said fluid converter and a gear mechanism. However an automobile provided with a hydraulic transmission is said to be less powerful, especially at "standing time" if compared with a vehicle provided with a manual transmission. This is explained because the efficiency range of the engine is restricted when using a fluid torque converter.

FIG. 3 shows the engine torque curve and a fluid torque converter efficiency range on a coordinate system where: Ne (engine rpm) is a function of Te (engine torque) wherein lines X and Y indicates the fluid torque converter efficiency range and line Z indicates the available maximum engine torque curve, according with its capacity. Avoiding the use of the fluid torque converter said engine torque is available in a uniform way below curve Z. However when using it in combination with a fluid torque converter the available range is limited to within the area enclosed by the lines X, Y and curve Z. The point "A" represents the "stall point" and it means that this is the maximum engine rpm in which the fluid torque converter output is still motionless. From this condition the time of "standing start" to a quarter mile is measured. The fact that an automobile having a hydraulic transmission has a longer "standing start" time that one having a manual transmission is based on the following reasoning: in FIG. 3 at "stall point" "A" the horse power is only 40 HP, although the engine is designed to provide more than 100 HP. It may be possible for a driver to manually bring the "stall point" up to the point "C" where the horse power is 65 HP if the vehicle is provided with a manual transmission. It is also possible to use a more efficient fluid torque converter so as to rise the "stall point". However in this case fuel efficiency will be decreased due to non-matching of the engine and the fluid torque converter capacities.

According to the present invention, a mechanic torque converter is provided interconnecting: an engine output; the driving wheels input; and a fluid torque converter, combined in such a way that at "starting time" when applying a brake band on the second planetary system ring gear of said mechanic torque converter, a torque is transmitted 100% in a mechanic way to the driving wheels, for an excellent mechanic efficiency and at this point the highest gear ratio is attainable due to the fact that a significant resistance is found at the driving wheels and a reaction takes place at the fluid torque converter which is transmitted to the mechanic torque converter for producing a change in the mechanic gear ratio. When vehicle starts moving the resistance becomes less at the driving wheels then, less resistance is found at the turbine at the fluid torque converter and a change in gear ratio takes place in both converters then, a smaller gear ratio is attainable according with the vehicle driving conditions. It is also possible to vary the efficiency range of the fluid torque converter itself because of the interaction of the mechanic torque converter thus, it may be possible to have the performance of the mechanic transmission, especially noticeable at "starting time" or when a significant resistance is found at the driving wheels, combined with a hydraulic transmission performance of equivalent gear ratio applied at the same time to a common converters output, without steps where no sensors, multi-disc clutches, "hydraulic brains" or complex hydraulic circuits are involved, for less components and a lower production cost.

1. An automatic transmission usually has a gear mechanism comprising two planetary gear systems.

According to the present invention both planetary gear systems used herein are exactly of the same geometrical dimensions then, taken into account that when a greater amount of parts of the same manufacture are made, the less the production cost and, if devices; machines as well as operative workers intervening in the process are the same one, the more the simplified production process.

2. An automatic transmission usually is never connected with the vehicle brake system.

According to the present invention, the vehicle brake system is connected with the first brake band servo in order to stop turbine T rotation for shifting purposes, but as brake drum FIGS. 1, 2, and 4 is also interconnected with the driving wheels then, when vehicle's brake is applied, said brake drum and driving wheels are braked at the same time.

BRIEF SUMMARY OF THE INVENTION

It is therefore an object of the present invention to provide an improved automatic transmission for automobiles, trucks, buses and other appliances.

It is another object of the invention to provide an improved automatic transmission for automobiles, trucks, buses and other appliances by improving its performance as well as structure qualities, making use of a required design and appropriated materials for a practical use, especially if the vehicles are not light in weight.

It is also an object of the invention to provide an improved automatic transmission for automobiles, trucks, buses and other appliances by improving and simplifying the production process and improving the production cost.

It is an additional object of the invention to provide an improved automatic transmission for automobiles, trucks and other appliances by improving vehicle's brake performance.

BRIEF DESCRIPTION OF THE SEVERAL VIEWS OF THE DRAWING

Various other objects, features and attendant advantages of the present invention will be more fully appreciated as the same becomes better understood from the following detailed description when considered connection with the accompanying drawing in which reference characters designate like or corresponding parts through the several views and herein.

DETAILED DESCRIPTION OF THE INVENTION

Figure 1:
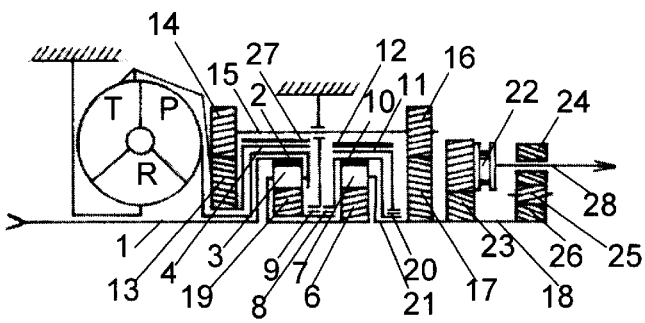
FIG. 1 illustrates the first embodiment of the automatic transmission of present invention.

In accordance with the first embodiment as shown in FIG. 1, engine torque is transmitted by means of shaft 1 to the ring gear 2, but as sun gear 19 is stopped in one way running direction because of the one-way clutch 9 attached to said sun gear 19 shaft end, then it is possible that planetary gears 3 may turn over sun gear 19 with a multiplied gear ratio provided by the first planetary gear system and transferring the converted torque to:

a) sun gear 6 (at the second planetary system) and to:

b) pump P (at the fluid torque converter)

At low engine rpm, two things may happen:

1. In FIG. 1, when sun gear 6 is running but brake band 12 at the second planetary gear system is not applied, the ring gear 10 runs freely itself in opposite direction related to engine rotation, meanwhile planetary gears 7 connected with shafts 21 and 18 as well as with the driving wheels remain motionless, then no torque is transmitted in a mechanic way to said driving wheels.

It is also said that converted torque from planetary gears 3 is also transferred to pump P at the fluid torque converter, for moving turbine T but as "stall point" "A" (FIG. 3) is not still reached, then not enough hydraulic torque is transmitted for moving the driving wheels.

2. When sun gear 6 (FIGS: 1, 2 and 4) is running, but brake band 12 at the second planetary gear system is applied on the brake drum 11, then the ring gear 10 is braked in one running direction because of the one-way clutch 20 attached between ring gear 10 end and brake drum 11 end, so planetary gears 7 start moving together with shafts 21 and 18 (FIG. 1) transmitting converted torque 100% into mechanic way to the driving wheels. It is also important to point out that at "starting time" the highest gear ratio is available because no gear ratio decrease takes place at both planetary gear systems. A wider explanation over this concern will be given in the following paragraphs.

Figure 3:
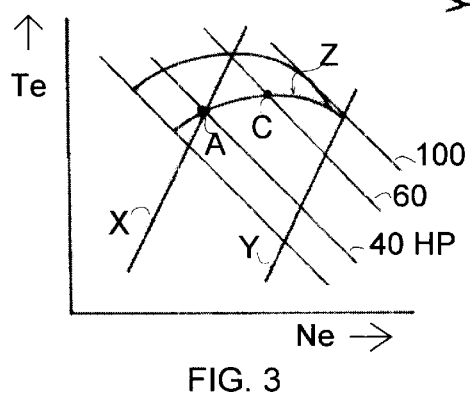
FIG. 3 is a graph showing an engine torque curve and torque converter efficiency range.

Converted torque from planetary gears 3 (FIGS. 1, 2 and 4) is constantly transmitted into the pump P at the fluid torque converter and if weather brake band 12 is applied or not, but engine rpm become enough to reach a value over the "stall point""A" FIG. 3 at said fluid torque converter, then: turbine T starts moving and torque is also transmitted by means of the fluid torque converter to a common converters output18 together with the mechanic torque converter to the driving wheels.

According with the vehicle driving conditions, two things may happen:

1. If a significant resistance is found at the driving wheels example: at starting time", etc, the same resistance is found at the turbine T at the fluid torque converter because of the mechanic connection among them, so a reaction takes place in said fluid torque converter, then torque is immediately increased, and in this way engine rpm may reach an adequate value for a suitable performance according with the vehicle driving conditions. At the same time when torque increase takes place at the fluid torque converter, a mechanic torque of an equivalent rate is obtained at the mechanic torque converter which is explained as follows:

FIG. 1 illustrates that shaft 18 which is mechanically connected with the driving wheels is also connected with the planetary gear system output by means of shaft 21 and at the same time with the turbine T at the fluid torque converter by means of gears 17 and 16; shaft 15; gears 14 and 13 to said turbine T. It is also shown that planetary gears 3 are connected at one end with the pump P at the fluid torque converter and, in the other end with the sun gear 6 then, pump P and sun gear 6 rotation speeds are the same, then when torque is increased to its maximum "top" at the fluid torque converter due to the highest resistance found at the driving wheels, pump P rotation speed becomes "x" times higher than the turbine T rotation speed, and if the second planetary gears 7 rotation speed is the same as the turbine T then the ring gear 10 remains motionless and planetary gears 7 and shafts 21 and 18 will turn around ax" times slower. At this conditions, as ring gear 10 remains motionless then sun gear 19 will also remain motionless, because no movement is transmitted by means of the one-way clutch 8, then taken into account that if gear 19 and ring gear 10 are motionless, the highest gear ratio is mechanically attainable.

2. If no significant resistance is found at the driving wheels, then no significant resistance is found at the turbine T at the fluid torque converter due to the mechanic connection between turbine T and the driving wheels and no reaction takes place in said fluid torque converter, then, torque from planetary gears 3 is not increased, so pump P and turbine T rotation speeds can be approximately the same.

It is said before that by means of the planetary gears 3 a mechanic converted torque is transmitted to:

a) turbine T (at the fluid torque converter) and to:

b) sun gear 6 (at the mechanic torque converter) but turbine T is connected with shaft 18, and planetary gears 7 output is also connected with shaft 18, then if no torque increase is produced at the fluid torque converter, no significant rotation speed difference is found between pump P and turbine T, then the rotation speed of planetary gears 3 and shaft 18 are approximately the same and as shaft 18 is also connected with the planetary gears 7 then the rotation speed of planetary gears 3 and planetary gears 7 are approximately the same too. It must be taken into account that at the present circumstances the rotation speed of sun gear 6 and the planetary gears 7 are approximately the same because an interconnection between them takes place in the following way: It is said that planetary gears 3 are connected with:

a) sun gear 6, and b) turbine T

If no torque increase is produced at the fluid torque converter the speed of pump P and turbine T is approximately the same, but turbine T is also connected with shaft 18 by means of the gears 13 and 14; shaft 15 and gears 16 and 17, buy planetary gears 7 output is also connected with shaft 18 by means of shaft 21, then the speed of sun gear 6 and planetary gears 7 is approximately the same. It is also taken into account that when the rotation speed of two members of a planetary gear system is the same, then no gear ratio is obtained, so, if the speed of the sun gear 6 and planetary gears 7 is the same, no gear ratio is obtained and the ensemble is turned around at the same speed. Taken into account the above reasoning, if ring gear 10 rotation is transmitted to the sun gear 19 by means of the one-way clutch 8, then sun gear 19 speed now is the same as the planetary gears 3 and no mechanic torque increase takes place at the first planetary gear system.

If no mechanic torque increase takes place in both planetary gear systems as a consequence that no hydraulic torque increase is neither obtained, then engine output rpm and converters output rpm are approximately the same, so no torque increase takes place and the gear ratio is near close 1 to 1.

A reverse drive mechanism is also provided which is connected between the common converters output shaft 18 and the driving wheels which includes: a gear mechanism and a sliding yoque 22 for shifting three different selecting positions: "D" drive; "N" neutral; and "R" reverse.

At the drive position "D", torque from he common converters output 18 is transmitted to the gears 26; 25 and 24 to an inner striated yoque 22 coupled with gear 24 which is connected with shaft 28 to the driving wheels.

At the neutral position "N" said yoque 22 is not shifted with gears 24 or 23 then, no torque is transmitted from the converters output 18 to the driving wheels.

At the reverse position "R" said yoque 22 is shifted with the gear 23 then torque from the common converters output 18 is transmitted to the gear 23 and yoque 22 to output shaft 28 and then to the driving wheels.

In order to change shifting position, engine rpm must be kept low, moreover a brake band 27 operated by the vehicle brake pump must be applied on brake drum 4 by pressing the brake pedal because in spite of sliding between pump P and turbine T even though "toric flow" is not strong enough for moving the vehicle, however it is enough for producing a strong pressure among coupled parts then without stopping turbine T rotation shifting becomes almost impossible.

Figure 2:
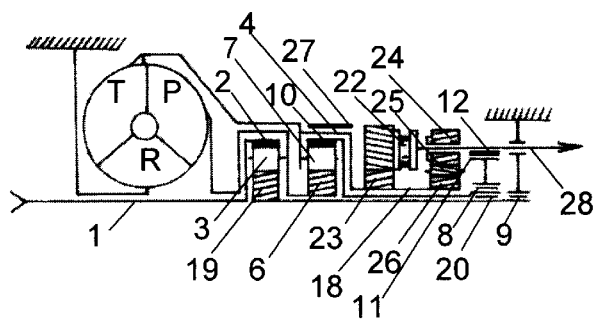
FIG. 2 illustrates the second embodiment of the automatic transmission of present invention.
Figure 4:
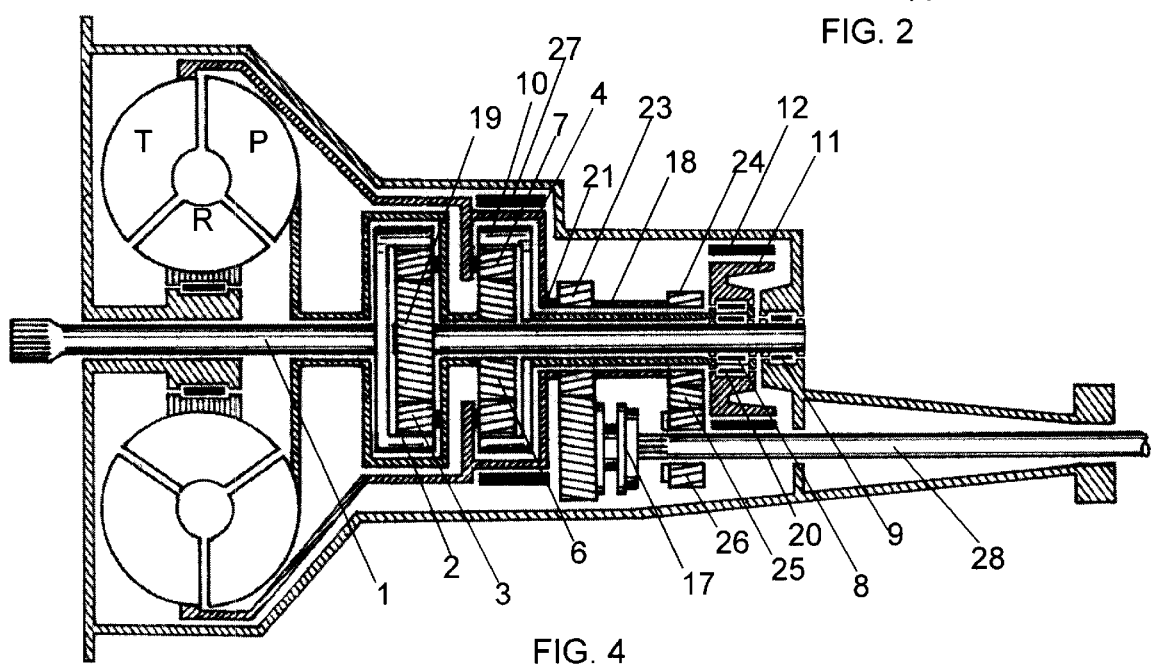
FIG. 4 shows in greater detail the assembly of the second embodiment.

FIGS. 2 and 4 shows a second embodiment which is different from the first embodiment only in organization and gears 13, 14; shaft 15; gears 16, 17 and 18 are also removed, although the performance of both embodiments are exactly the same.

Reference numbers of FIG. 1 are given to FIGS. 2 and 4 in order to avoid a repeated written explanation as set forth at the beginning of the Detailed Description of the Invention.

Figure 5:
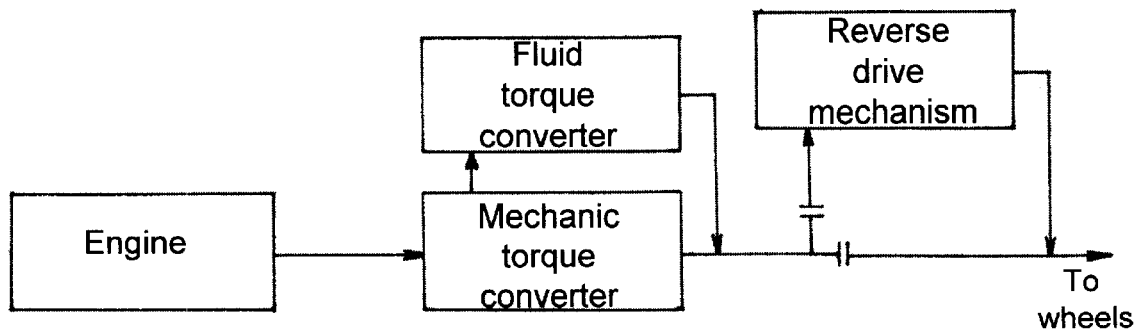
FIG. 5 is a graph showing the torque route.

FIG. 5 shows the torque route in which engine torque is transmitted to a mechanic torque converter then, converted torque from the first planetary gear system of said mechanic torque converter is transmitted to a fluid torque converter and simultaneously to the second planetary gear system of the mechanic torque converter itself. From the common converters output, reconverted or not reconverted torque (in accordance with the vehicle driving conditions) is transmitted to the shifting selector transmitting the torque to the driving wheels.

Figure 6:
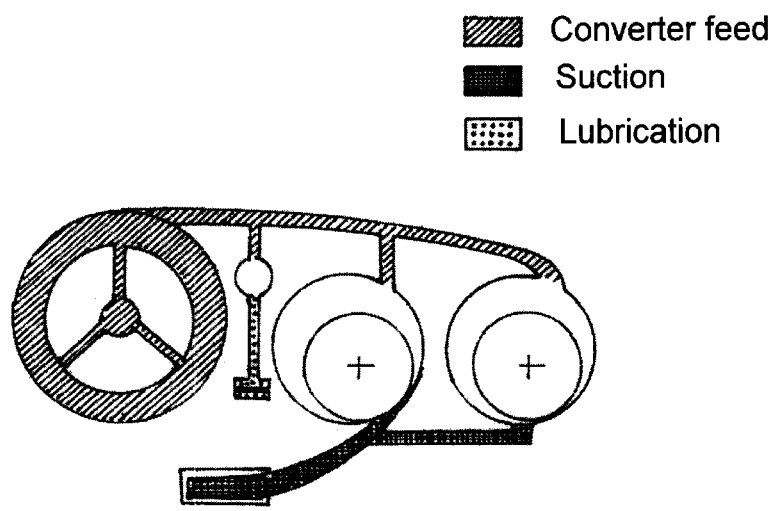
FIG. 6 illustrates the hydraulic circuit of the embodiments.

FIG. 6 illustrates the oil path from oil pumps to the fluid torque converter and lubrication holes.

Hydraulic circuit is limited only for the above purposes.

Figure 7:
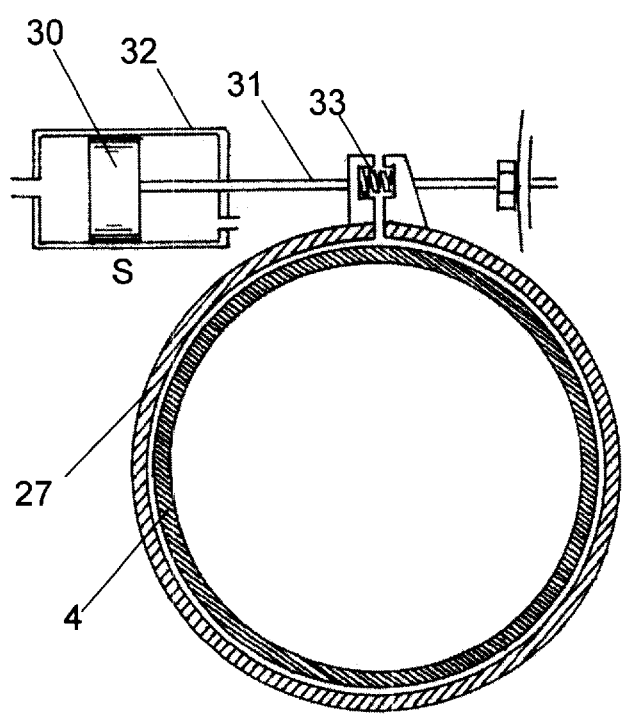
FIG. 7 shows in greater detail the first brake band assembly.

FIG. 7 shows the first brake band assembly in which a brake band 27 is applied to the brake drum 4 by means of a servo S when pressing the brake pedal. Servo S comprises a piston 30 fixed in a stem 31, mounted in a cylinder liner 32 which is connected with the brake band 27. If no hydraulic pressure is applied to the cylinder 32 then, no contact is produced among brake band 27 and brake drum 4 because of the spring 33 pressure, but if any hydraulic pressure is applied to said cylinder 32, then the brake band 27 is applied to the drum 4 which is connected with turbine T and common converters output 18.

Figure 8:
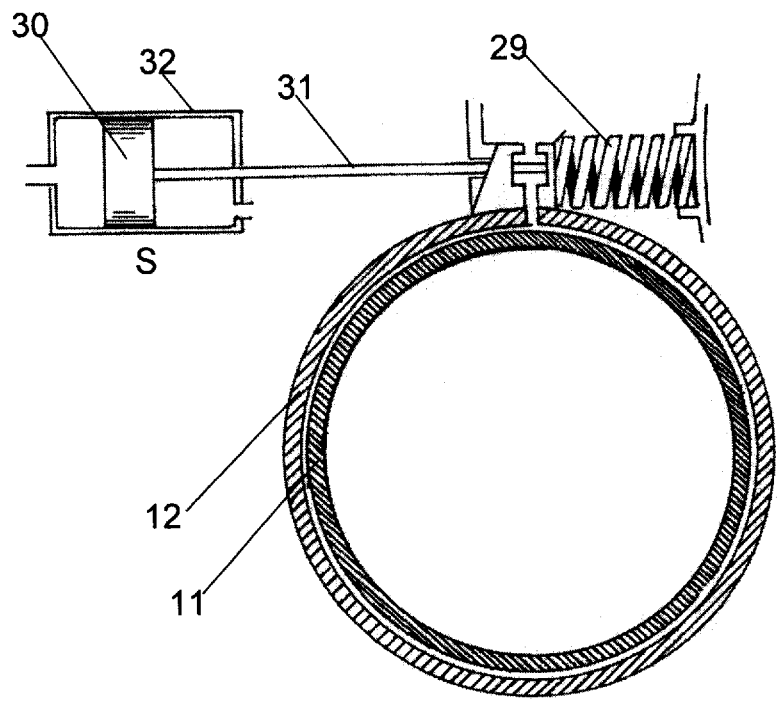
FIG. 8 shows in greater detail the second brake band assembly.

FIG. 8 shows the second brake band assembly in which a brake band 12 is applied to the brake drum 11 by means of the spring 29, but said brake drum 11 is also connected in one way running direction by means of the one-way clutch 20 with the ring gear 10. If no hydraulic pressure is applied to the cylinder 32 the spring 29 keeps the band 12 and brake drum 11 braked then ring gear 10 is also braked in one running direction. If any hydraulic pressure is applied to the cylinder 32 by pressing brake pedal, then the spring 29 is contracted and the brake band 12 is released from drum 11 and ring gear 10 is also released.

It is also necessary to point out that hydraulic pressure is applied to both cylinders at a time, then when any of the brake bands is applied the other is released.

Obviously, numerous modifications and variations of the present invention are possible in light of the above teachings. It is therefore to be understood that within the scope of the appended claims, the invention may be practiced otherwise than as specifically described herein. A single cylinder may be installed instead of two, as an optional solution.

What we claim as our invention is:

1. An automatic transmission for an appliance having an internal combustion engine and wheels, comprising:

(a) a mechanical torque converter connected with an engine output for converting torque from the engine and transmitting the mechanically converted torque to the wheels; (b) a fluid torque converter connected with said mechanical torque converter for modifying both converters' gear ratio and transmitting torque, together with the mechanical torque converter, to a common converters output and to the wheels; and (c) a reverse drive mechanism connected with the common converters output for reversibly transmitting converted torque to the wheels, wherein said mechanical torque converter comprises two planetary gear systems connected with the fluid torque converter and the converters common output.

2. An automatic transmission for an appliance having an internal combustion engine and wheels, comprising:

(a) a mechanical torque converter connected with an engine output for converting torque from the engine and transmitting the mechanically converted torque to the wheels; (b) a fluid torque converter connected with said mechanical torque converter for modifying both converters' gear ratio and transmitting torque, together with the mechanical torque converter, to a common converters output and to the wheels; and (c) a reverse drive mechanism connected with the common converters output for reversibly transmitting converted torque to the wheels, wherein said mechanical torque converter further comprises a first and second interconnected planetary gear system, a first brake band operatively associated with said fluid torque converter's turbine and common converters output, a second brake band operatively associated with said second planetary gear system, a first one-way clutch associated with the first planetary gear system, a second one-way clutch for interconnecting said first and second planetary gear systems, and a third one-way clutch associated with said second brake band and second planetary system.

\* \* \* \* \*